United States Patent
Liang et al.

(10) Patent No.: US 8,948,266 B2
(45) Date of Patent: Feb. 3, 2015

(54) ADAPTIVE INTRA-REFRESH FOR DIGITAL VIDEO ENCODING

(75) Inventors: Yi Liang, San Diego, CA (US); Khaled Helmi El-Maleh, San Diego, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1571 days.

(21) Appl. No.: 11/025,297

(22) Filed: Dec. 28, 2004

(65) Prior Publication Data

US 2006/0078051 A1 Apr. 13, 2006

Related U.S. Application Data

(60) Provisional application No. 60/618,383, filed on Oct. 12, 2004.

(51) Int. Cl.
   *H04N 7/12* (2006.01)
   *H04N 19/176* (2014.01)
   *H04N 19/164* (2014.01)
   (Continued)

(52) U.S. Cl.
   CPC ... *H04N 19/00278* (2013.01); *H04N 19/00236* (2013.01); *H04N 19/00933* (2013.01); *H04N 19/00157* (2013.01); *H04N 19/0003* (2013.01);
   (Continued)

(58) Field of Classification Search
   USPC .................. 375/240, 240.01, 240.12, 240.16, 375/240.24, 240.15; 714/18; 380/217
   See application file for complete search history.

(56) References Cited

U.S. PATENT DOCUMENTS 5,754,754 A * 5/1998 Dudley et al. .................... 714/18
5,991,403 A * 11/1999 Aucsmith et al. ............. 380/217

(Continued)

FOREIGN PATENT DOCUMENTS

| EP | 0485798 | 5/1992 | ............... H04N 7/13 |
| EP | 1439714 | 7/2004 | ............... H04N 7/68 |
| JP | 2001359102 | 12/2001 | |

OTHER PUBLICATIONS

Tan, Soon Hie, et al., "Classified Perceptual Coding With Adaptive Quantization". IEEE Transactions on Circuits and Systems for Video Technology. 1996. pp. 375-388, vol. 6, No. 4 XP000599293.

(Continued)

*Primary Examiner* — Allen Wong
(74) *Attorney, Agent, or Firm* — Kevin T. Cheatham

(57) ABSTRACT

An adaptive Intra-refresh (IR) technique for digital video encoding adjusts IR rate based on video content, or a combination of video content and channel condition. The IR rate may be applied at the frame level or macroblock (MB) level. At the frame level, the IR rate specifies the percentage of MBs to be Intra-coded within the frame. At the MB level, the IR rate defines a statistical probability that a particular MB is to be Intra-coded. The IR rate is adjusted in proportion to a combined metric that weighs estimated channel loss probability, frame-to-frame variation, and texture information. The IR rate can be determined using a close-form solution that requires relatively low implementation complexity. For example, such a close-form does not require iteration or an exhaustive search. In addition, the IR rate can be determined from parameters that are available before motion estimation and compensation are performed.

42 Claims, 10 Drawing Sheets

(51) Int. Cl.
    *H04N 19/89*      (2014.01)
    *H04N 19/14*      (2014.01)
    *H04N 19/107*     (2014.01)
    *H04N 19/172*     (2014.01)
    *H04N 19/147*     (2014.01)
    *H04N 19/61*      (2014.01)

(52) U.S. Cl.
    CPC ... *H04N 19/00266* (2013.01); *H04N 19/00175* (2013.01); *H04N 19/00781* (2013.01)
    USPC .................................................. 375/240.24

(56) References Cited

U.S. PATENT DOCUMENTS

| | | | | |
|---|---|---|---|---|
| 6,339,617 | B1* | 1/2002 | Ueda | 375/240.16 |
| 6,671,322 | B2* | 12/2003 | Vetro et al. | 375/240.16 |
| 2002/0094028 | A1 | 7/2002 | Kimoto | 375/240.14 |
| 2002/0114392 | A1* | 8/2002 | Sekiguchi et al. | 375/240.15 |
| 2002/0114394 | A1* | 8/2002 | Ma | 375/240.16 |
| 2003/0016754 | A1 | 1/2003 | Gandhi et al. | 375/240.24 |
| 2003/0031128 | A1 | 2/2003 | Kim et al. | 370/229 |

OTHER PUBLICATIONS

Cote, Guy, et al., "Optimal Intra Coding of Blocks for Robust Video Communication Over the Internet". Elsevier Science B.V. 1999. pp. 25-34, vol. 15.

He, Zhihai, et al. "Joint Source Channel Rate-Distortion Analysis for Adaptive Mode Selection and Rate Control in Wireless Video Coding". IEEE Transactions on Circuits and Systems for Video Technology. Jun. 2002. pp. 511-523, vol. 12, No. 6 XP00114979.

Cheng, Liang, et al., "Perceptual Quality Feedback Based Progressive Frame-Level Refreshing for Robust Video Communication" IEEE Communications Society. 2004. pp. 2047-2052.

International Search Report and Written Opinion—PCT/US2005/037072, International Search Authority—European Patent Office—Jun. 29, 2006.

* cited by examiner

ADAPTIVE INTRA-REFRESH FOR DIGITAL VIDEO ENCODING

This application claims the benefit of U.S. Provisional Application No. 60/618,383, filed Oct. 12, 2004, the entire content of which is incorporated herein by reference.

TECHNICAL FIELD

The disclosure relates to digital video encoding and, more particularly, techniques for adaptive Intra-refresh (IR) when compressing digital video frames.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved transmission efficiency of video sequences by encoding data in a compressed manner. Compression reduces the overall amount of data that needs to be transmitted for effective transmission of video frames.

The MPEG-4, ITU H.263 and ITU H.264 standards, for example, support video encoding techniques that utilize similarities between successive video frames, referred to as temporal or Inter-frame correlation, to provide Inter-frame compression. The Inter-frame compression techniques exploit data redundancy across frames by converting pixel-based representations of video frames to motion representations. Frames encoded using Inter-frame techniques are referred to as P ("predictive") frames or B ("bi-directional") frames. Some frames, or macroblocks (MBs) within a frame, are encoded using spatial, Intra-frame compression, which is non-predictive. An Intra-coded frame is typically referred to as an I ("Intra") frame.

Transmission of video data over a wireless network can be unreliable due to channel loss. Errors resulting from channel loss can adversely impact the quality of video presented to a user. In particular, channel errors can reduce not only the quality of a current frame, but also subsequent Inter-coded frames generated from the current frame using motion estimation and compensation techniques. To limit propagation of channel-induced errors from one frame to another, a video encoder typically applies an Intra-refresh (IR) technique. According to IR techniques, MBs within a P frame are selectively Intra-coded, rather than Inter-coded. Intra-coded MBs can improve error resilience, but require an increase in the number of bits that must be transmitted. Therefore, the IR rate impacts encoding performance in terms of both error resilience and bandwidth efficiency.

SUMMARY

The disclosure is directed to techniques for adaptive IR of video blocks, such as MBs, within a digital video frame. The techniques adjust the IR rate based on video content, or a combination of video content and channel condition. The IR rate may be applied at the frame level or the MB level. At the frame level, the IR rate specifies the percentage of MBs to be Intra-coded within the frame. At the MB level, the IR rate defines a statistical probability that a particular MB is to be Intra-coded.

Video content may be evaluated based on both frame-to-frame variation and Intra-frame texture information. Frame-to-frame variation may be judged, for example, by the sum of squared difference (SSD) from frame to frame. Frame texture information can be characterized in terms of frame variance, which generally indicates texture complexity. Channel condition may be determined from an estimated channel loss probability.

The IR rate is adjusted in proportion to a combined metric that weighs estimated frame-to-frame SSD, texture information, and channel loss probability. The combined metric is proportional to estimated channel loss probability and SSD, but inversely proportional to frame variance. The IR rate varies as the combined metric varies, providing an adaptive IR scheme that balances error resilience, bandwidth efficiency, and implementation complexity.

Notably, the IR rate can be determined using a close-form solution that requires relatively low implementation complexity. For example, such a close-form generally does not require iteration or an exhaustive search. In addition, the IR rate can be determined from parameters that are available before motion estimation and motion compensation is performed for a particular frame or MB.

In one embodiment, the disclosure provides a video encoding method comprising obtaining a measure of frame-to-frame variation between a current frame and another frame, obtaining texture information for the current frame, and generating an Intra-refresh (IR) rate for the current frame based on the frame-to-frame variation and the texture information.

In another embodiment, the disclosure provides a video encoder comprising an Intra-refresh (IR) rate control unit to generate an IR rate for a current frame based on a measure of frame-to-frame variation between the current frame and another frame and texture information for the current frame, and a mode select unit to select Inter-coding or Intra-coding for macroblocks (MBs) within the current frame based on the IR rate.

In an additional embodiment, the disclosure provides a video encoding method comprising generating an Intra-refresh (IR) rate for a current video frame based on video content of the current video frame, and selecting Inter-coding or Intra-coding for macroblocks (MBs) within the current frame based on the IR rate.

In another embodiment, the disclosure provides a video encoder comprising an Intra-refresh (IR) rate control unit to generate an IR rate for a current video frame based on video content of the current video frame, and a mode select unit to select Inter-coding or Intra-coding for macroblocks (MBs) within the current frame based on the IR rate The disclosure also contemplates computer-readable media comprising instructions to cause one or more processors forming a video encoder to carry out any of the techniques described herein.

The details of one or more embodiments are set forth in the accompanying drawings and the description below. Other features, objects, and advantages will be apparent from the description and drawings, and from the claims.

DETAILED DESCRIPTION

Figure 1:
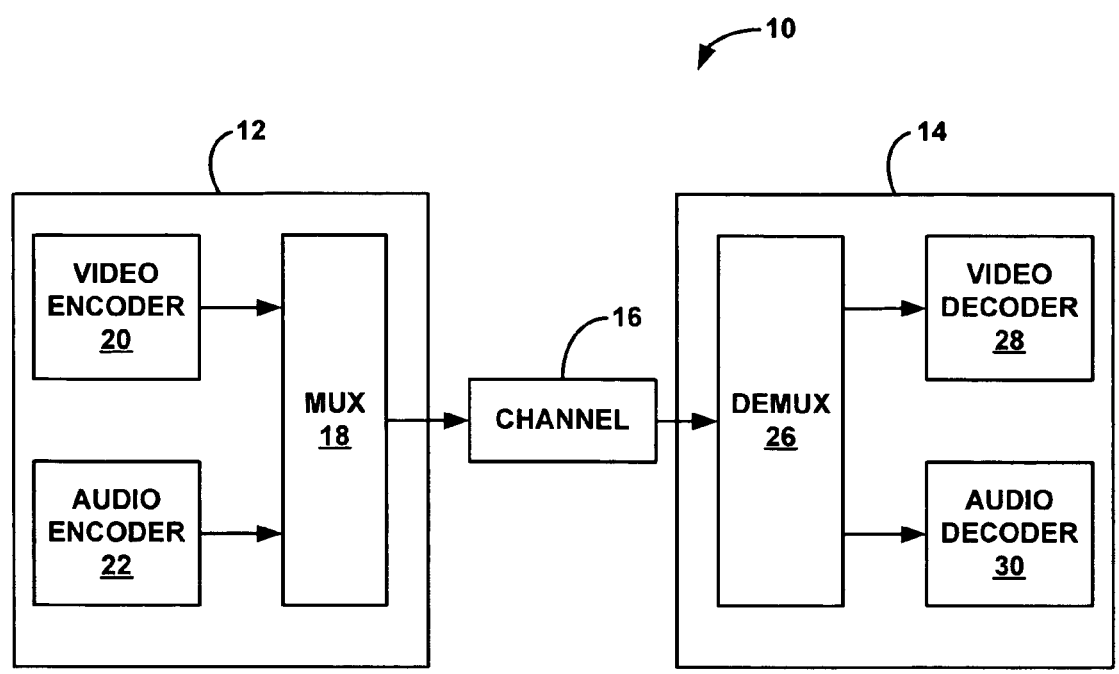
FIG. 1 is a block diagram illustrating a video encoding and decoding system.

FIG. 1 is a block diagram illustrating a video encoding and decoding system 10. As shown in FIG. 1, system 10 includes an encoder system 12 and a decoder system 14 connected by a transmission channel 16. Encoder system 12 includes a multiplexer (MUX) 18, a video encoder 20 and an audio encoder 22. Decoder system 14 includes a demultiplexer (DEMUX) 26, a video decoder 28, and an audio decoder 30. As will be described, video encoder 20 may be configured to apply an adaptive IR technique. According to the adaptive IR technique, video encoder 20 determines an IR rate at which video blocks, such as MBs, within a particular P frame are to be Intra-refreshed. The IR rate generally determines the number of MBs that will be Intra-refreshed, and may be applied at the frame level or MB level.

The IR rate may be determined based on video content, or a combination of video content and channel condition. For example, the IR rate may be determined based on a combined metric that measures estimated channel loss probability, frame-to-frame variation between a current frame and another frame, and texture information for the current frame. Hence, the adaptive IR technique may consider both video content and channel condition. Given the IR rate, video encoder 20 also may apply an adaptive search technique to identify particular MBs to be Intra-refreshed within the frame. The adaptive search technique may rely on texture information, and can be performed prior to motion estimation.

System 10 may provide bi-directional video transmission, e.g., for video telephony. Accordingly, reciprocal encoding, decoding, MUX and DEMUX components may be provided on opposite ends of channel 16. In some embodiments, encoder system 12 and decoder system 14 may be embodied within video communication devices such as wireless mobile terminals equipped for video streaming, video telephony, or both. The mobile terminals may support video telephony according to the Session Initiated Protocol (SIP), ITU H.323 standard, ITU H.324M standard, or other standards.

Video encoder 20 generates encoded video data according to a video compression standard, such as MPEG-2, MPEG-4, ITU H.263, or ITU H.264. Audio encoder 22 encodes audio data to accompany the video data. MUX 18 obtains adaptation layer video and audio data units from video encoder 20 and audio encoder 22. MUX 18 multiplexes the video data and audio data to form a series of multiplex data units for transmission via channel 16. As an example, MUX 18 and DEMUX 26 may operate according to the H.223 multiplexer protocol, published by the ITU. However, other protocols may be used, such as the user datagram protocol (UDP).

Channel 16 carries the multiplexed information to decoder system 14 as physical layer data units, which may be referred to as logical transmission units (LTUs). Channel 16 may be any physical connection between encoder system 12 and decoder system 14. For example, channel 16 may be a wired connection, such as a local or wide-area network. Alternatively, as described herein, channel 16 may be a wireless connection such as a cellular, satellite or optical connection, which can be prone to significant errors due to loss of transmitted packets. Channel 16 may support transmission of wireless packets according to any of a variety of radio frequency (RF) protocols, such as W-CDMA, CDMA2000 1×, CDMA2000 1× EV-DO, or CDMA2000 EV-DV.

DEMUX 26 identifies the multiplex data units from the LTUs and demultiplexes the content of the multiplex layer data units to produce video and audio adaptation layer data units. The adaptation layer data units are processed in the adaptation layer to produce video data frames. Video decoder 28 decodes the video data frames at the application layer to produce a stream of video data for use in driving a display device. In particular, video decoder 28 decodes individual video slices within the video data frames. Audio decoder 30 decodes the audio data to produce audio.

The adaptive IR technique applied by video encoder 20 may be applied with relatively low complexity. According to this technique, video encoder 20 Intra-refreshes MBs within a P frame according to the adjusted IR rate. Using frame-to-frame variation, texture information, and estimated channel loss probability, video encoder 20 dynamically adjusts the IR rate for incoming video frames. The IR rate may be adjusted for each frame, or adjusted for MBs within a given frame.

The channel, variation, and texture parameters may be weighted to form a combined metric that serves as the basis for adjustment of IR rate. In this manner, video encoder 20 can be configured to apply an IR technique that is both channel- and content-adaptive. In particular, channel condition is represented by the estimated channel loss probability, while video content is represented by both frame-to-frame variation between a current frame and another frame and texture information for the current frame.

Frame-to-frame variation can be determined by a sum of squared difference (SSD) metric between a current frame and a previous frame. Texture information may be determined by variance within a current frame or MB. Variance represents the pixel variation of video content within a frame or MB. High variance generally indicates more complex video content within a given frame or MB, and tends to correlate with a higher Intra-coding cost. However, higher channel loss and frame-to-frame variation tend to correlate with higher error rate or quality degradation due to error propagation, and support Intra-coding for the sake of error resilience.

Consideration of channel and video content parameters permits an adaptive approach that balances error resiliency and encoding efficiency. Also, as will be described, by considering parameters that are available prior to motion estimation, the adaptive IR technique permits a low complexity implementation. In particular, the IR technique makes use of a close-form solution that does not require completion of the entire encoding process.

The IR techniques described herein may be implemented within a general purpose microprocessor, digital signal processor (DSP), application specific integrated circuit (ASIC), field programmable gate array (FPGA), or other equivalent logic devices. For example, video encoder system 12, and its components, may be implemented as parts of an encoding process, or coding/decoding (CODEC) process, running on a digital signal processor (DSP) or other processing device. Accordingly, components described as modules may form programmable features of such a process, and may be realized together on a common processor or separate processors.

Video encoder system 12 may have a dedicated memory for storing instructions and data, as well as dedicated hardware, software, firmware, or combinations thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions cause one or more processors to perform certain aspects of the functionality described in this disclosure.

Figure 2:
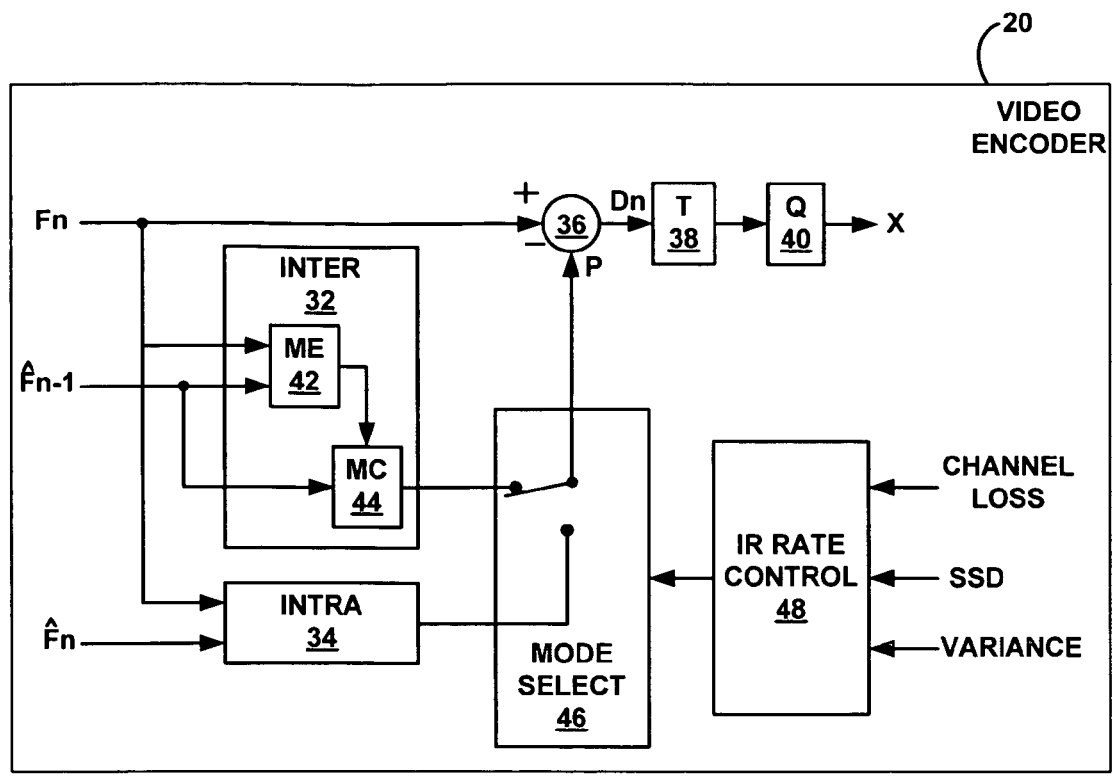
FIG. 2 is a block diagram illustrating a video encoder system employing an adaptive IR technique in accordance with this disclosure.

FIG. 2 is a block diagram illustrating a video encoder 20 employing an adaptive IR technique in accordance with this disclosure. As shown in FIG. 2, video encoder 20 includes Inter-coder 32, Intra-coder 34, difference unit 36, transform (T) unit 38 and quantization (Q) unit 40. Difference unit 36 subtracts an Inter- or Intra-prediction P from an incoming digital video frame Fn to produce a difference Dn. The Inter- or Intra-prediction P is obtained from either Inter-coder 32 or Intra-coder 34. Transform unit 38 applies a standard compression transform, such as the discrete cosine transform (DCT), to transform the output of difference unit 36 into frequency components. Quantization unit 40 quantizes the transformed output to produce X, which is a set of quantized transform coefficients.

Inter-coder 32 performs Inter-coding of frame Fn, e.g., according to the MPEG-4 or H.264 compression method. As shown in FIG. 2, Inter-coder 32 includes a motion estimation (ME) unit 42 and motion compensation (MC) unit 44 to support standard Inter-coding of the incoming frame Fn relative to one or more previously encoded frames F̂n−1. In particular, an Inter prediction P is formed by motion-compensated prediction from one or more previous frames F̂n−1. The previous frames may be previously encoded and reconstructed to produce F̂n−1.

Intra-coder 34 performs Intra-coding of the incoming video frame Fn to produce an Intra prediction P. The Intra prediction is formed from samples in the current frame Fn that have been previously encoded, decoded and reconstructed to form reconstructed frame F̂ n. The resulting Intra prediction P is applied to difference unit 36 when video encoder 20 is operating in Intra-mode to produce difference Dn. Intra-coder 34 may perform Intra-coding to generate I frames, or Intra-code selected MBs within a P frame to support Intra-refreshing.

A mode select unit 46 selectively switches between Inter-coding and Intra-coding, e.g., on a frame-by-frame or MB-by-MB basis. In particular, mode select unit 46 selects either the output of Inter-coder 32 or Intra-coder 34 on either a frame level or MB level. In this manner, mode select unit 46 determines whether the prediction P applied to difference unit 36 will be Inter-coded or Intra-coded. Mode select unit 46 is responsive to IR rate control unit 48, which dynamically adjusts the IR rate within video encoder 20 to control mode select unit 46.

IR rate control unit 48 may update the IR rate on a frame-by-frame basis or MB-by-MB basis. If the IR rate is determined for an entire frame, then that IR rate applies to all MBs in the frame. If the IR rate is determined for individual MBs, however, the IR rate may change from MB to MB. In this case, the IR rate may be applied as a probability to each individual MB to determine whether Intra-coding should be applied.

As discussed above, IR rate control unit 48 adaptively adjusts the IR rate based on a combination of channel and content inputs. Specifically, as shown in FIG. 2, IR rate control unit 48 receives and processes an estimated channel loss probability (CHANNEL LOSS), frame-to-frame or MB-to-MB variation value, which may be a sum of squared difference (SSD) value, and a texture value, which may be expressed in terms of pixel level variance (VARIANCE).

The estimated channel loss probability quantifies the likelihood that the current frame will be dropped when transmitted across channel 16, and hence characterizes the channel. SSD and variance characterize the actual content of the frame or MB to be encoded. Again, IR rate control unit is adaptive to changes in both channel loss and video content.

CHANNEL LOSS, SSD AND VARIANCE may be individually weighted and summed to form a combined metric for IR rate adjustment. IR rate control unit 48 responds to changes in the combined metric by adjusting the IR rate, which is then applied to control mode select unit 46 to select either Inter- or Intra-coding on a frame-level or MB-level basis.

Notably, IR rate control unit 48 relies on readily available parameters that can be obtained pre-mode, i.e., before a frame or MB is Inter-coded using motion estimation and motion compensation. In this manner, IR rate can be determined using a close-form solution, rather than an iterative or exhaustive search, providing relatively low implementation complexity.

IR rate control unit 48 adapts to changes in channel condition and video content in determining whether an MB in a P frame should be Intra-coded. In general, the IR rate increases when estimated channel loss probability increases, with SSD and variance remaining constant. The IR rate also increases when SSD increases, with estimated channel loss probability remaining constant. The IR rate decreases, however, when variance of the video content in a current frame increases. The IR rate varies as these input quantities vary, which reflects the adaptive nature of the technique.

The IR rate generated by IR rate control unit 48 is used by mode select unit 46 to render an IR decision, which results in selection of the output of either Inter-coder 32 or Intra-coder 34 for prediction P. This mode selection can be applied at the frame level such that the IR rate is fixed for the entire frame. In this case, mode select unit 46 applies the IR rate for the entire frame, but needs to select particular MBs to be Intra-refreshed in a number sufficient to satisfy the IR rate. If the IR rate is determined at the MB level, however, mode select unit 46 reacts to changes in IR rate as it scans MBs within a frame.

In a frame-level implementation, the IR rate generated by IR rate control unit 48 may be expressed as the fixed percentage of the MBs within the current frame that must be Intra-coded. In an MB-level implementation, the IR rate may be expressed as the statistical probability that a particular MB is to be Intra-coded. SSD and variance are measured on the frame level for the frame-level implementation, and at the MB level for the MB-level implementation. Channel condition measurements may be obtained periodically, and used for either frame-level or MB-level IR rate adjustment.

Texture information for a frame can be represented in terms of variance. In general, the variance of the video content within the current frame or MB represents the cost of Intra-coding the current content. If there is significant variation among adjacent MBs in a frame, Intra-coding will require significantly more bits than Inter-coding. The SSD from frame to frame represents the amount of motion from frame to frame, and directly maps to potential decoder distortion in the event a packet loss occurs in the transmission channel.

Accordingly, higher SSD favors Intra-coding for purposes of error resilience. The adaptive IR rate technique described in this disclosure can strike a balance between compression efficiency and error-robustness, while reducing overall distortion given a particular data rate.

The SSD can be measured on entire frames in a frame-level implementation, or on co-located MBs in a MB-level implementation. The SSD can be measured across the reconstructed or original, version of the previous frame Fn-1, and the original version of the current frame Fn, before any motion estimation and compensation has been performed. In this way, an early "pre-mode" decision can be made with respect to IR rate. Alternatively, in some embodiments, an SSD or sum of absolute difference (SAD) metric can be measured across the frames after motion-compensation is performed.

The estimated channel loss probability can be obtained in a variety of different ways. As examples, the estimated channel loss probability may be determined based on receiver feedback from a remote terminal, e.g., via H.245 signaling in a H.3xx-based video telephony standard, or real time transport control protocol (RTCP) in the form of quality of service (QoS) feedback. As a simple alternative, estimated channel loss probability can be estimated at the encoder side using loss statistics from the received bitstream from the remote terminal, assuming symmetry of channel distortion in the transmit and received directions of channel 16. In either case, unlike SSD and variance, channel loss probability may not provide an exact temporal correlation with the frame or MB under consideration, but can be obtained relatively frequently.

In a frame-level implementation, after the percentage of MBs to be Intra-coded is determined for a given P frame, the actual MBs that are to be Intra-coded can be determined in different ways. Mode select unit 46 may be configured to select regions of MBs, or individual MBs, in order to satisfy the IR rate prescribed by IR rate control unit 48. For example, MBs can be selected according to a cyclic approach in which MBs are Intra-refreshed sequentially and periodically in a fixed, predefined pattern from frame to frame.

Alternatively, mode select unit 46 may discriminate among MBs according to predetermined rules. For example, MBs having lower variance, e.g., below a particular threshold, can be preferentially chosen by mode select unit 46 for Intra-refreshing, in comparison to MBs having higher variance (and higher coding cost). In this case, the search for MBs to be Intra-refreshed is carried out according to video content and, more particularly, texture of the underlying video represented by the MBs.

As a further alternative, a variety of random approaches may be employed to identify MBs for IR. For example, some random approaches may involve random selection of MBs, or selection of different regions of MBs within a frame on a random basis. Yet another approach may combine cyclic, adaptive and random aspects to provide a hybrid IR technique.

According to each MB selection technique described above, for a frame level implementation, the number of Intra-refreshed MBs within a given P frame corresponds to the IR rate specified by IR rate control unit 48. For an MB-level implementation, however, the MB under consideration is selected for Intra-refresh according to an IR rate calculated for the respective MB by IR rate control unit 48. The IR rate is determined and applied on a MB-by-MB basis throughout a given P frame. In this case, the IR rate is applied as a probability, and the mode selection result has the effect of "flipping a probability-biased coin." In other words, if the MB under consideration has a high IR rate assigned to it by IR rate control unit 48, there will be a high probability that it will be selected for Intra-refresh by mode select unit 46.

The adaptive IR rate technique described herein can be considered self content-adaptive in the sense that it responds to changes in video content, e.g., SSD and variance, for the current frame or MB. In addition, advantageously, such changes can be detected before any motion estimation and compensation is performed on the frame or MB. In some cases, such a technique can be tuned using a single sample sequence, and applied to any video sequence without additional tuning or setting any parameters or thresholds. This adaptive IR rate technique also may work well in case Intra-coded frames are used, by adjusting the IR rate according to the period of Intra-coded frames and the estimated channel loss probability.

In some embodiments, the IR rate, at either the frame or MB level, can also be pre-determined according to system configurations such as the Intra-frame period, frame rate, data rate, frame size and the like, in conjunction with video content and channel condition. Hence, this adaptive IR rate control technique may be responsive not only to estimated channel loss probability, SSD and variance, but also to one or more system configuration parameters established for video encoder 20.

In some embodiments, for lower complexity, the IR rate control technique can be simplified to consider a subset of the inputs described above. For example, instead of considering estimated channel loss probability, SSD, and variance, the technique may be configured to consider only the estimated channel loss probability. In this manner, the IR rate control does not even need to access the video content to determine the IR rate. Instead, the IR rate can be determined by the estimated channel loss probability only, and tuned to work for most video sequences. This limited technique may be somewhat less effective, but provides an additional option that may be desirable for reduced complexity.

Figure 3:
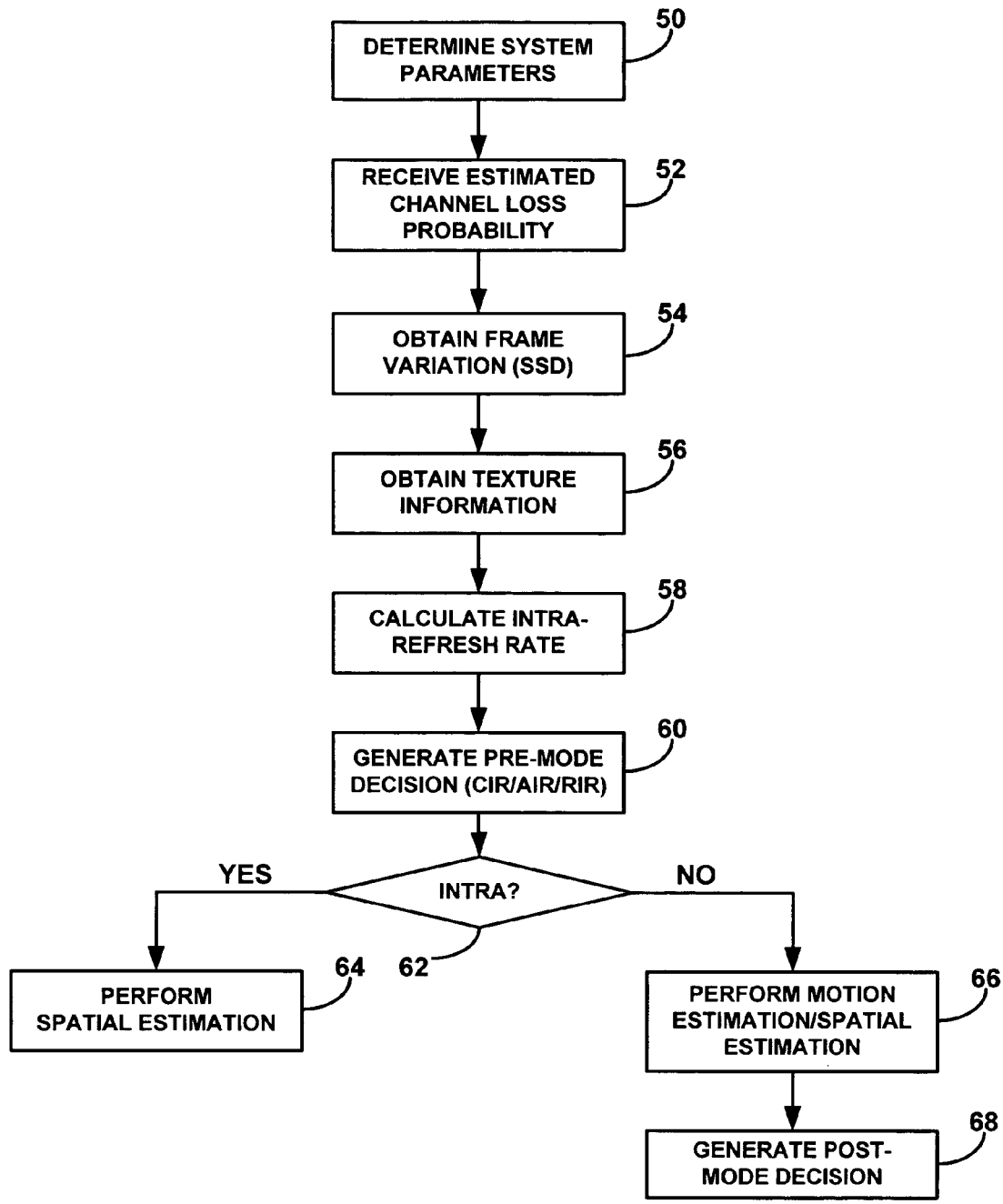
FIG. 3 is a flow diagram illustrating the operation of an exemplary adaptive IR technique.

FIG. 3 is a flow diagram illustrating the operation of an exemplary adaptive IR technique. In the example of FIG. 3, IR rate control unit 48 determines one or more selected system configuration parameters (50) for video encoder 20. As discussed above, for example, IR rate control unit 48 may determine the Intra-frame period, frame rate, data rate, and frame size selected for video encoder 20. IR rate control unit 48 then receives an estimated channel loss probability (52), frame variation (54), which may be represented by an SSD value, and texture (56), which may be represented by pixel variation. As discussed above, estimated channel loss probability may be determined in a variety of ways.

Based on the estimated channel loss probability, frame variation and texture, and optionally one or more system configuration parameters, IR rate control unit 48 calculates a new IR rate (58) and passes the IR rate to mode selection unit 46 for generation of a pre-mode IR decision (60) with respect to the current frame or MB. As indicated, in a frame-level implementation, the IR decision may be carried out by a cyclical IR (CIR), adaptive IR (AIR), or random IR (RIR) scheme (60). According to the CIR scheme, MBs are refreshed in a periodic pattern. An AIR scheme may evaluate individual MBs, e.g., based on texture information such as variance, to select MBs for Intra-refresh. RIR involves randomly selecting individual MBs or groups of MBs for Intra-refresh.

In each case, the number of Intra-refreshed MBs corresponds to the IR rate calculated (58) by IR rate control unit 48. Use of AIR, RIR or a hybrid IR that combines CIR, AIR, and RIR aspects can prevent localization of Intra-refresh. A hybrid IR scheme combines the benefits of cyclic and adaptive refreshing strategies to reduce channel distortion while minimizing the difference in quality between Intra-coded and Inter-coded MBs in neighboring MBs and frames.

If the mode decision for a particular frame results in Intra-coding (62), video encoder 20 performs spatial estimation (64), in the example of H.264. If the mode decision results in Inter-coding (62), video encoder 20 performs motion estimation and spatial estimation (66) and generates a post-mode decision (68), e.g., using Inter-coder 32 of FIG. 2. The process then proceeds to the next frame or MB for adjustment of the IR rate based on any changes in estimated channel loss probability, SSD, and variance. Notably, as shown in FIG. 3, the Intra-coding decision is made before any motion estimation is performed.

To determine the IR rate, given the inputs described herein, IR rate control unit 48 may be configured to apply a rate-distortion model for a given target coding bit rate $R_s$, e.g., as described in Z. He, J. Cai, and C. W. Chen, "Joint source channel rate-distortion analysis for adaptive mode selection and rate control in wireless video coding," IEEE Transactions on Circuits and Systems for Video Technology, Volume: 12, Issue: 6, June 2002, pages: 511-523. Application of the rate-distortion model may be expressed as follows:

$$D_{total} = D_s + D_c$$

$$D_s = d + \beta \cdot \text{Var}[F(n)]$$

$$\overline{D}_c = \frac{a}{1-b+b\beta} \cdot \frac{p}{1-p} \cdot E\{F_d(n, n-1)\}$$

To minimize total distortion $D_{total}$, the following equation must be satisfied:

$$\frac{\partial \overline{D}_{total}}{\partial \beta} = 0$$

To determine the IR rate $\beta$, the following equation is used:

$$\beta = \sqrt{c \cdot \frac{D[\hat{F}(n-1), F(n)]}{\text{Var}[F(n)]} \cdot \frac{p}{1-p}}$$

clamp $\beta$ to [0, 30%]

where:
D (Ds=source distortion and Dc=channel distortion) is represented by SSD between adjacent frames, quantifying potential error propagation
Var is variance, quantifying the complexity of the current frame and the cost of Intra coding
p is the estimated channel loss probability
a, b, c and d are constants,
$\hat{F}(n-1)$ is the reconstructed previous frame, and
F(n) is the current frame.

IR rate control unit 48 applies the resulting IR rate $\beta$ to mode select unit 46 to make the Inter/Intra coding decision, which may be made at the frame level or the MB level. As indicated above, $\beta$ is obtained using a close-form solution, rather than an iterative or exhaustive search. This relative simplicity offers significantly reduced complexity in the implementation of IR rate control unit 48.

Although the above approach offers relatively low complexity, further reductions in complexity may be achieved by alternative implementations. As one example, IR rate control module 48 may be configured to apply only a channel adaptive scheme in which the IR rate $\beta$ is determined only on the basis of estimated channel loss probability as follows:

$$\beta = \sqrt{c_1 \cdot \frac{p}{1-p}}$$

wherein $c_1$ is a constant. As a further alternative, IR rate control unit 48 may be configured to apply a sum of absolute difference (SAD) metric after performance of motion compensation to determine IR rate $\beta$ as follows:

$$\beta = \sqrt{c_2 \cdot \frac{SAD[\hat{F}(n-2), F(n-1)]^2}{\text{Var}[F(n-1)]} \cdot \frac{p}{1-p}}$$

where SAD is used instead of SSD to represent distortion D, and $c_2$ is another constant.

In a conventional system, the Intra/Inter mode decision is made after performing a motion-estimation search to find the best motion vector or vectors for a given MB, in the sense of the minimum sum-of-absolute difference (SAD). This conventional approach can be referred to as a motion-based Intra/Inter mode decision. In accordance with this disclosure, however, an adaptive MB Intra-refreshing (AIR) scheme permits the Intra/Inter mode decision without the need for the intensive computations carried out in a motion-search engine.

Again, instead of a motion-based Intra/Inter mode decision, mode select unit 46 may be configured to apply a texture-based Intra/Inter mode decision algorithm, which relies on variance. Given a desirable refreshing rate $\beta$ for M MBs for a P frame, mode select unit 46 selects the MBs that have the least texture information, i.e., the least coding bits requirements, to be the Intra-coded MBs. The steps of the texture-based Intra/Inter mode decision, for each MB, can be expressed as follows:

1. Calculate MB variance, e.g., give an estimate of the texture.
2. Compare the calculated variance with an average variance estimated from a previous frame (or frames), e.g., average texture bits from the previous frame(s).
3. Intra-code the MB if its variance is less than a scaled average variance of the previous frame; otherwise Inter-code the MB.
4. If the number of Intra-coded MBs satisfies the Intra-refresh rate $\beta$ for the frame, then stop the texture-based Intra-Inter mode decision process.
5. Apply the motion-based mode decision process to the remaining MBs in the frame, which may result in additional Intra-coded MBs.

The texture-based mode decision process also can be represented by the following pseudo code:

```
If (A < α . B)
{
mode = INTRA;
mode_Intra++;
if (mode_Intra > M) goto motion_estimation;
else
```

```
goto DCT_quantization;
}
else
    goto motion_estimation; (normal operation)
``` where A is the variance of the current MB, B is the average variance of the previous frame, α is an empirical threshold, mode_Intra is a counter of Intra-coded MBs using the texture-based mode decision, and M is the desirable number of INTRA-coded MBs in a P frame, e.g., as determined by IR rate control unit 48. The process motion_estimation represents standard motion estimation and a motion-based Intra/Inter decision. DCT_quantization represents application of the standard DCT transform and quantization, e.g., by transform unit 38 and quantization unit 40 of FIG. 2.

Figure 4:
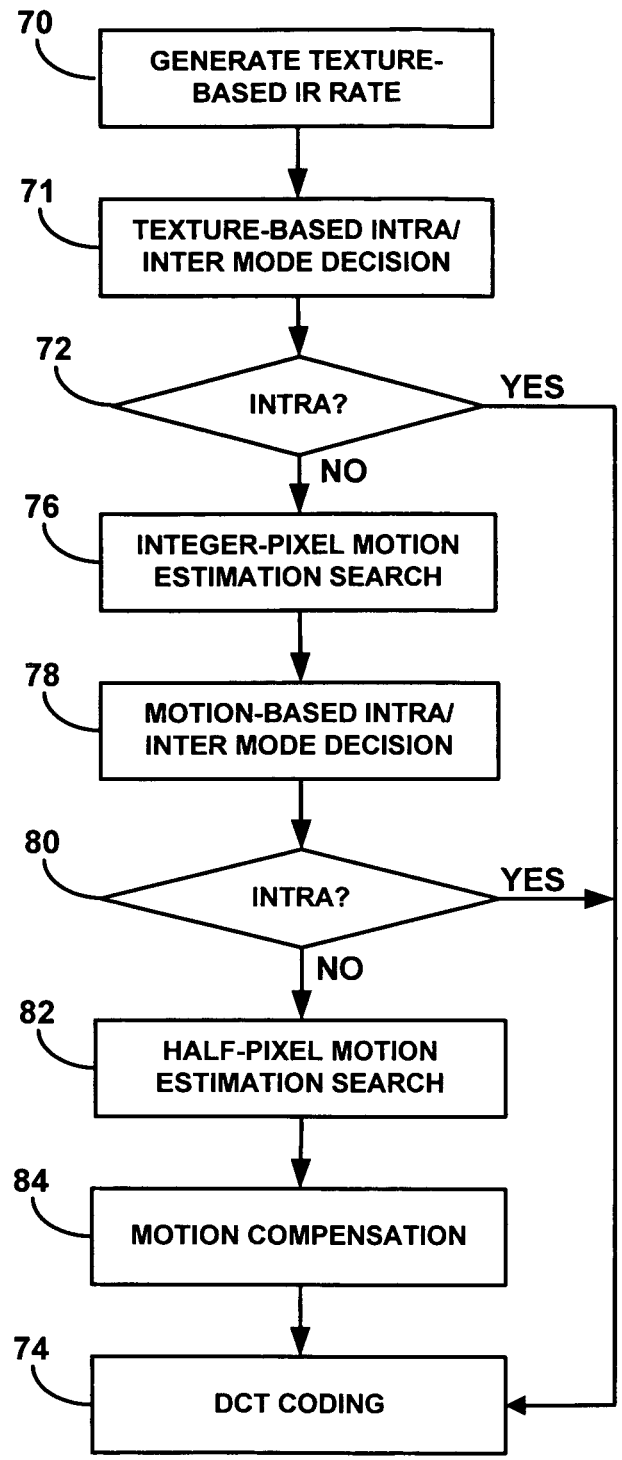
FIG. 4 is a flow diagram illustrating a texture-based Intra/Inter coding decision process.

FIG. 4 is a flow diagram illustrating the texture-based Intra/Inter coding decision process. As shown in FIG. 4, IR rate control unit 48 generates the texture-based IR rate (70), e.g., using estimated channel loss probability, SSD, and variance, as described herein. Mode select unit 46 then applies the IR rate to render a texture-based Intra/Inter mode decision (71). If the texture-based Intra/Inter mode decision (71) calls for Intra coding (72), then Intra-coder 34 is selected, and the Intra-coded MB is applied to difference unit 36 and DCT coding by transform unit 38 (74).

If the texture-based decision by mode select unit 46 does not indicate Intra-coding, video encoder 20 next submits the MB to an integer-pixel motion estimation search (76), and applies a standard motion-based Intra/Inter mode decision (78), e.g., within Inter-coder 32 of FIG. 2. If Intra-coding is indicated (80), the Intra-coded MB is submitted for DCT coding (74). If Intra-coding is not indicated (80) by the motion-based Intra/Inter mode decision, then the MB is submitted to standard motion compensation. In particular, video encoder 20 may apply a half-pixel motion estimation search (82) followed by motion compensation (84). The resulting Inter-coded prediction is then applied to difference unit 36, followed by DCT coding (74).

Using a texture-based algorithm, as described herein, to decide whether an MB will be Inter- or Intra-coded can result in a repeated pattern of Intra-coded MBs in consecutive frames, i.e., Intra-coded MBs at the same locations in the frames. Repetition may occur due to the typically high temporal correlation across neighboring frames. In general, repetition is not a desirable feature for prevention of error propagation. In particular, errors are typically random in nature and fall in different areas (MBs) within a frame.

To prevent a repeated pattern, mode select unit 46 may be further configured to apply a randomization algorithm. In this case, mode select unit 46 randomizes the selection of Intra-coded MBs by searching different regions, i.e., "grids," in consecutive frames. This technique may be referred to as grid-based adaptive IR (AIR). According to this grid-based AIR technique, a P frame is broken into multiple equal regions. In successive frames, different regions are selected first for consideration in the texture-based Intra-Inter decision.

Figure 5:
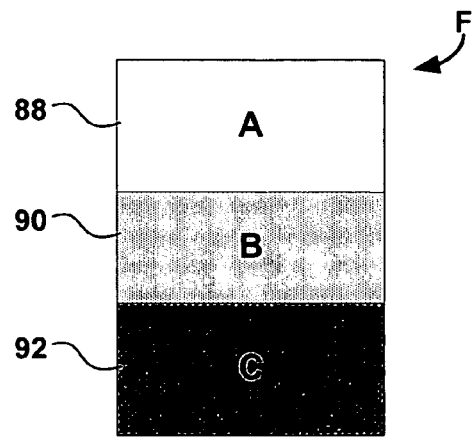
FIG. 5 is a diagram illustrating a video frame segmented into three different search regions to support a texture-based Intra-Inter coding decision process.

FIG. 5 is a diagram illustrating a video frame F segmented into three different search grids A, B, C to support a texture-based Intra-Inter coding decision process. Frame F includes three grids A, B, C for purposes of illustration. Accordingly, a greater or lesser number of grids, as well as different grid sizes, may be employed in different implementations. A grid-based AIR process, as described above, is applied to select one of grids A, B, C for use in the texture-based Intra/Inter decision process.

Upon selection of a particular grid A, B, C, the texture-based Intra/Inter decision process is confined to the selected grid, or at least starts in that grid before considering other grids. If the selected grid yields enough Intra-coded MBs to satisfy the applicable IR rate for the frame, then there is no need to search other grids for the texture-based Intra/Inter coding decision. However, MBs within the selected grid and the other grids may be reconsidered for purposes of the motion-based Intra/Inter coding decision.

In any event, by selecting different grids A, B, C for the start of the texture-based Intra/Inter coding decision in successive frames, repetition and concentration of Intra-coded MBs within a localized region of successive frames can be prevented. In other words, by rotating the search grid from frame to frame, persistent localization of Intra-coded MBs from frame to frame can be prevented. Yet, selection and rotation of different grids A, B, C of MBs represents relatively low implementation complexity.

As an example, for a quarter common Intermediate format (QCIF) frame with 99 MBs in each frame, the frame may be divided into three equal grids A, B, C of MBs as follows:

A [0-32],
B [33-65], and
C [66-98], where $[i_1, i_2]$ indicates the grid boundaries, with $i_1$ as the index of the starting MB and $i_2$ as the index of the end MB. Again, the designation of three grids within a given frame is for purposes of illustration, and should not be considered limiting. Also, grids may be rotated in a different pattern. For example, selection of grid A in one frame may be followed by selection of grid C in the next frame, rather than a successive rotation from A to B to C.

Figure 6:
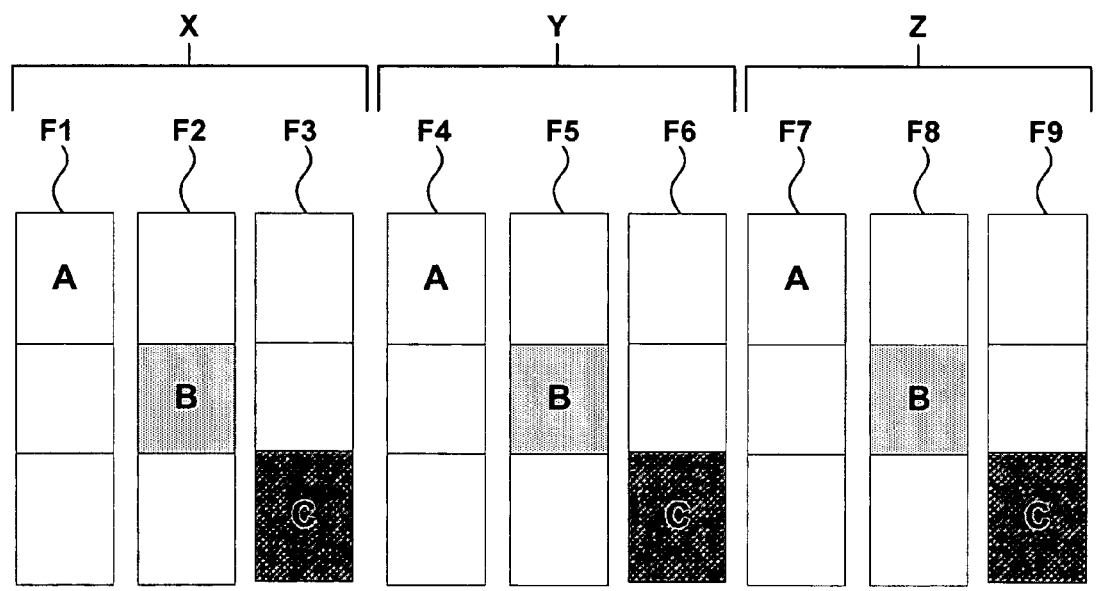
FIG. 6 is a diagram illustrating a sequence of nine P frames with different, uniform adaptive IR search regions.

FIG. 6 is a diagram illustrating a sequence of nine P frames F1-F9 with different, uniform adaptive IR search grids. FIG. 6 illustrates rotation of search grids from frame to frame so that the same search grid is not used as the starting point for the texture-based Intra/Inter coding decision process in consecutive frames. In frame F1, for example, the texture-based Intra/Inter coding decision process starts in selected grid A. In the next frame F2, the decision process starts in a different grid B. Likewise, a different grid C is selected in the next frame F3. In this manner, the selected grid is rotated frame-to-frame over the first three frames F1, F2, F3. Then, the process repeats for the next three frames, as indicated by selected grids A, B, C in frames F4, F5, and F6, respectively, and for the next three frames, as indicated by selected grids A, B, C in frames F7, F8, F9, respectively.

In a cycle of three consecutive P frames, e.g., F1 to F3, the process starts by selecting M (where M<33) MBs in grid A to be Intra-coded in frame F1 using the texture-based mode decision. Then, for the next P frame F2, M MBs in grid B are selected to be Intra-coded, and for the third frame F3, M MBs are selected in grid C. This procedure is repeated for the next three P frames F4 to F6, and then repeated, for the following three frames F7 to F9, using this pattern of grids A, B, C, A, B, C, A, B, C, and so forth. Each cycle of three consecutive P frames is designated X, Y, or Z in FIG. 6.

Again, this process prevents the Intra-refreshing of MBs in the same locations in three consecutive P frames. However, after the first cycle X of three P frames F1 to F3, Intra-refreshed MBs may again occur at the same locations as in the first cycle. In particular, the same grids are selected in the next two cycles Y, Z of P frames F4 to F6 and F7 to F9, respectively. To increase the chance of refreshing every MB in a P frame, the Intra/Inter mode decision for each MB may be stored only in the grid where IR is performed. In this manner, repetition of Intra-refreshing for an MB too soon is avoided.

Figure 7:
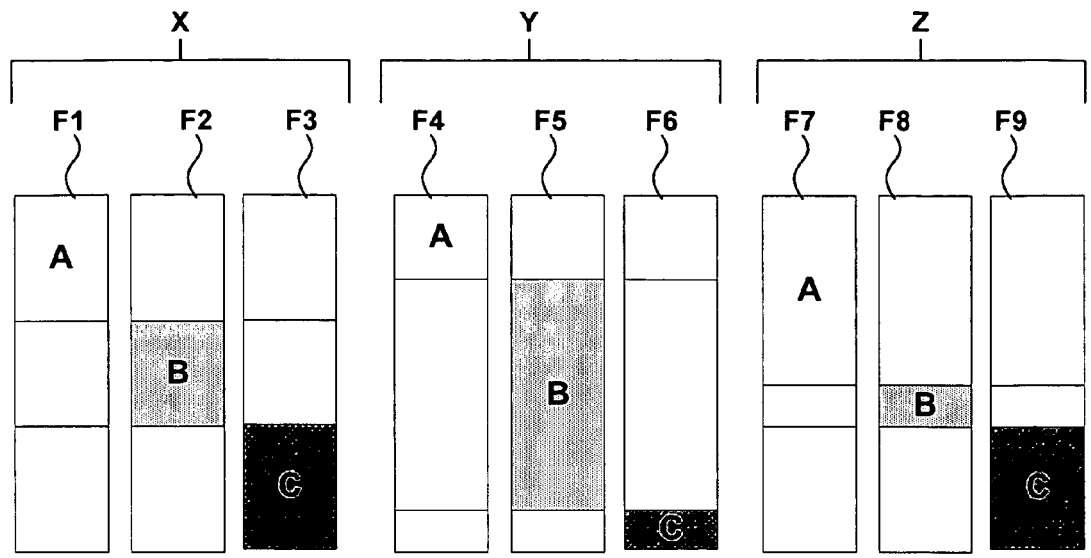
FIG. 7 is a diagram illustrating a sequence of nine P frames with different, nonuniform adaptive IR search regions.

In the example of FIGS. 5 and 6, the grid-based AIR technique divides each frame into three uniformly sized grids. FIG. 7 is a diagram illustrating a sequence of nine P frames with different, nonuniform adaptive IR search grids. In a first series X of three frames F1, F2, F3, equally sized grids A, B, C, respectively, are selected for the IR decision process. In the second series Y of frames F4, F5, F6, however, the sizes of the individual grids A, B, C are varied. In particular, in the example of FIG. 7, grid A of frame F4 is substantially smaller than grid A of frame F1, while grid B of frame F5 is substantially smaller than grid B of frame F2. Also, grid C of frame F6 is substantially smaller than grid C of frame F3. In the next series Z of three frames F7, F8, F9, grid B is the smallest grid, followed by grid C and grid A, in ascending order.

An approach that relies on nonuniform grid sizes between consecutive frame series, as illustrated in FIG. 7, can provide an added measure against repetition of Intra-coded MBs in the same locations from frame to frame. In some cases, the size of the starting grid may be sufficiently small that the texture-based Intra/Inter decision process is assured of extended into another grid. In frame F6, for example, the starting grid C is so small that the IR rate will likely exceed the number of MBs in that grid. In this case, the texture-based Intra/Inter decision process extends into the next designated grid, which may be either the A grid or the B grid in the frame F6, depending on the implementation.

As another option, a hybrid IR (HIR) scheme may be used instead of a single type of IR, such as CIR, AIR, or RIR. As an example, a hybrid IR scheme may combine aspects of both CIR and AIR, resulting in improved error resilience performance and better visual quality. For example, using cyclic IR only with a high IR rate may result in an annoying, wave-like visual artifact in consecutive frames. On the other hand, relying only on AIR may not permit the consideration of every MB in a frame for possible IR. A hybrid IR scheme that combines the benefits of cyclic and adaptive refreshing patterns can provide improved performance over CIR or AIR alone.

According to the hybrid IR scheme, a percentage of the IR rate may be distributed between CIR and AIR. The percentage of the IR rate committed to CIR is accomplished by a standard CIR scheme in which MBs are Intra-refreshed sequentially and periodically in a predefined pattern. The percentage of the IR rate committed to AIR is accomplished by an adaptive IR scheme, as described herein, where a texture-based Intra/Inter decision process is applied to individual MBs within a frame. For AIR, MBs having lower variance are preferentially chosen for Intra-refreshing. In contrast, texture information is generally immaterial for CIR. In a hybrid IR scheme, CIR and AIR combine to provide enhanced performance.

Figure 8:
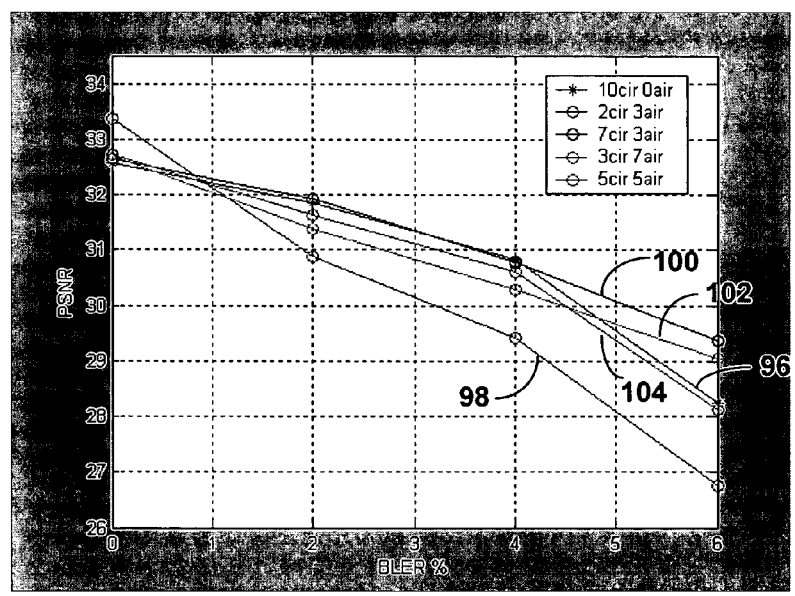
FIG. 8 is a graph illustrating comparative experimental results for cyclical IR (CIR) and hybrid IR control techniques.

FIG. 8 is a graph illustrating comparative experimental results for CIR and hybrid IR schemes. The graph of FIG. 8 plots block error rate (BLER) vs. peak signal to noise ratio (PSNR) for five different IR schemes. The performance of a first scheme that is exclusively CIR at a 10 percent IR rate is represented by curve 96. Curve 98 represents performance of a hybrid scheme that combines 2 percent CIR and 3 percent AIR for a total IR rate of 5%. Curves 100, 102, and 104 represent performance results for hybrid schemes the combine CIR/AIR at percentages of 7/3, 3/7, and 5/5, respectively. The graph of FIG. 8 represents results for a QCIF frame sequence (Mother-Daughter) encoded at 15 fps and 48 kbps.

FIG. 9-12 are additional graphs illustrating comparative experimental results for various IR techniques. The conditions for the graphs of FIGS. 9-12 were as follows: encoding rate=48 Kbps, Intra-frame period is 400, frame length is 150, and PSNR is measured in dB. In each case, the multiple video sequences were used.

Figure 9:
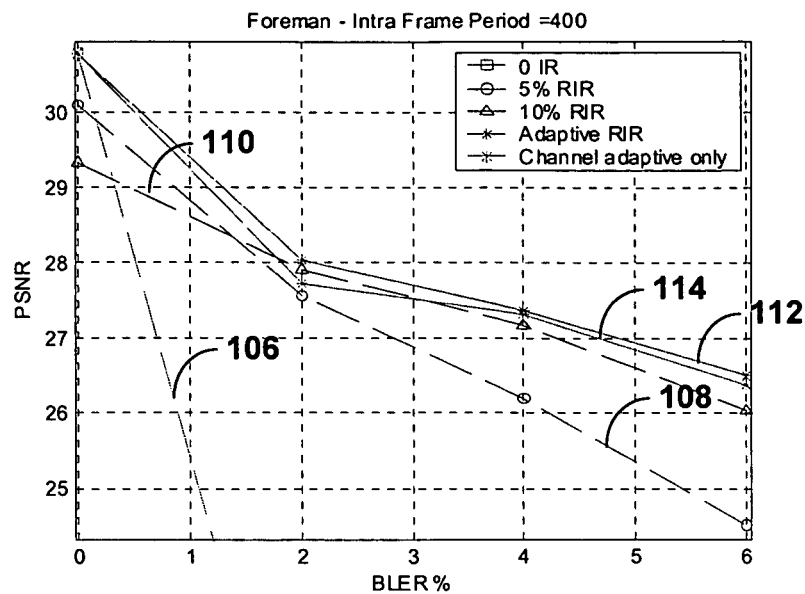
FIG. 9-12 are additional graphs illustrating comparative experimental results for various IR control techniques.
Figure 10:
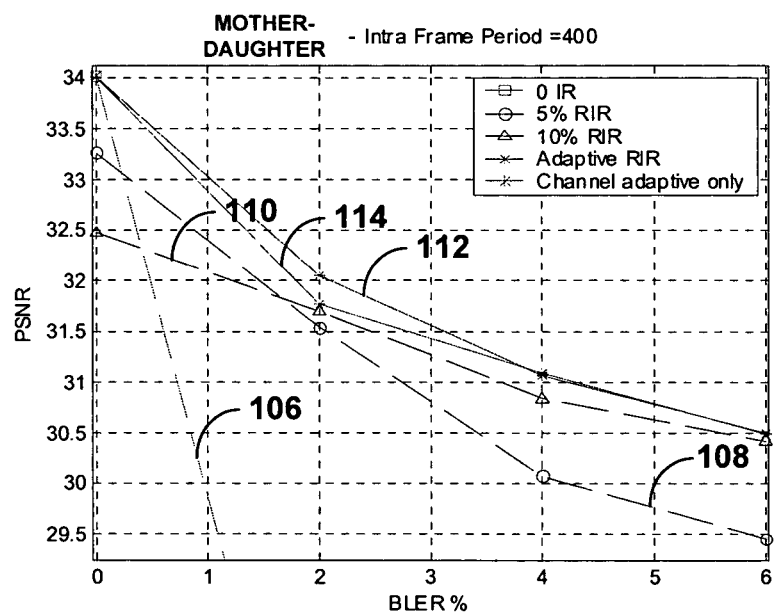

In FIG. 9, curves 106, 108, 110, 112, and 114 represents results for (1) 0 percent IR, (2) 5% standard RIR, (3) 10% standard RIR, (4) adaptive RIR using estimated channel loss probability, SSD, and variance as described herein, and (5) adaptive RIR using only estimated channel loss probability, respectively, with an Intra-frame period of 400 for the Foreman sequence. FIG. 10 represents the same experiment as FIG. 9, but shows results for the Mother-Daughter sequence.

Figure 11:
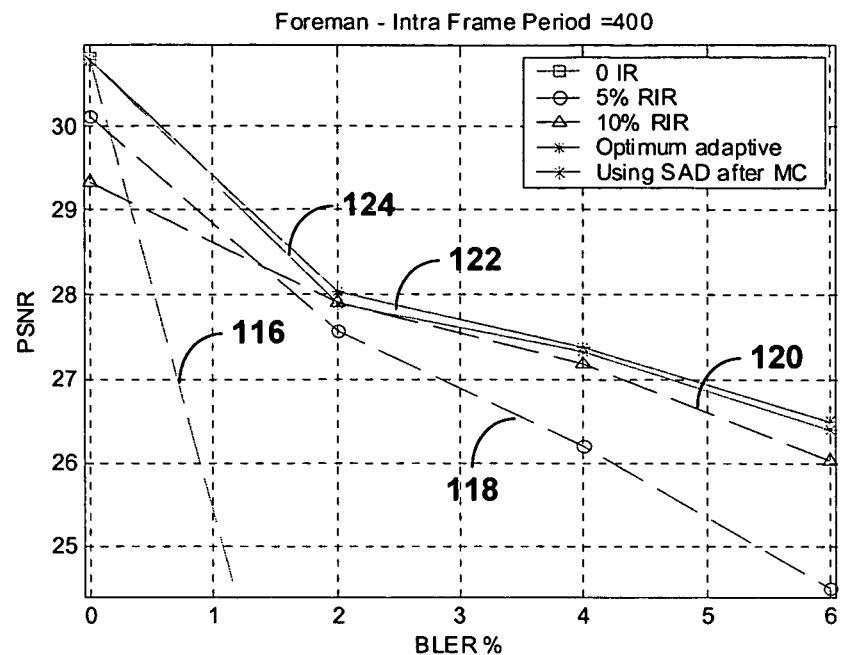
Figure 12:
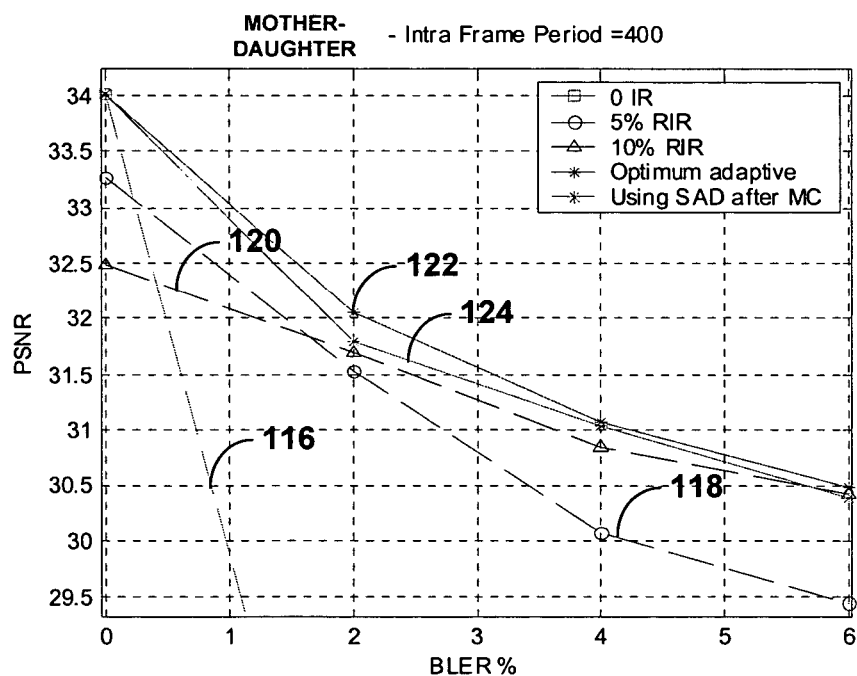

In FIGS. 11 and 12, curves 116, 118, 120, 122, 124 represent results for (1) 0 percent IR, (2) 5% standard RIR, (3) 10% standard RIR, (4) optimum adaptive RIR, and (5) adaptive RIR using a SAD metric after motion compensation, respectively. The optimum adaptive RIR scheme uses accurate measures without any approximation or substitution. FIGS. 11 and 12 both pertain to an Intra-frame period of 400 for the Foreman and Mother-Daughter sequences.

Figure 13:
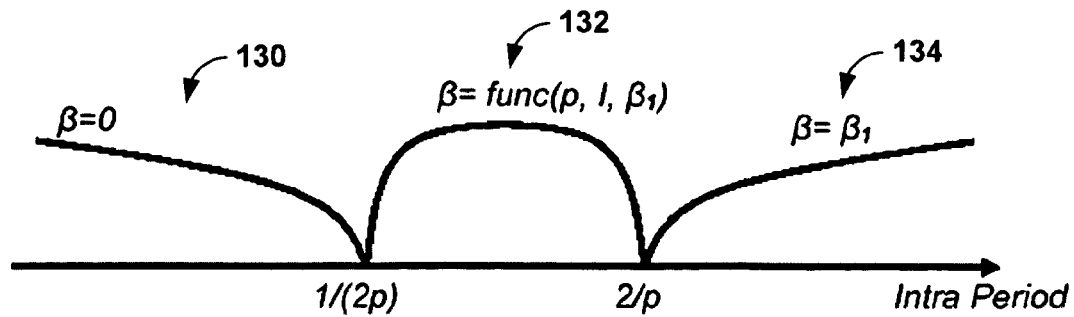
FIG. 13 is a diagram illustrating IR control according to Intra-frame period.

FIG. 13 is a diagram illustrating IR adjustment according to Intra-frame period in accordance with another embodiment. In general, this application has described the adjustment of IR rate, using a channel adaptive approach or a video content and channel adaptive approach, for cases in which the Intra-frame period is relatively long. When Intra frames are more frequently used, in smaller periods, the MB IR rate can be reduced. Accordingly, this disclosure further contemplates adjustment of the IR rate based on not only video content and channel condition, but also Intra-frame period. In this case, the IR rate produced using estimated channel loss probability, frame-to-frame variation and Intra-frame texture can be further adjusted according to the prevailing Intra-frame period.

For the long Intra-period case, the IR rate is generally denoted as $\beta_1$, the estimated channel loss probability asp, the Intra-frame period as I, and the adjusted IR rate as $\beta$. Adjustment according to the Intra-frame period can be described terms of three different regions 130, 132, and 134 of the Intra-frame period I. In regions 130, 132, 134, the Intra-frame period is less than 1/(2p), between 1/(2p) and 2/p, and greater than 2/p, respectively. In these regions, the IR rate $\beta$ determined based on estimated channel loss probability, frame-to-frame variation and Intra-frame texture can be further adjusted as a function of Intra-frame period I as follows:

$$\beta = \begin{cases} 0, \text{ if } I < \dfrac{1}{2p}; \\ \beta_1, \text{ if } I > \dfrac{2}{p}; \\ \min(1,16p) \cdot \dfrac{I-1-f}{I-2} \beta_1, \text{ otherwise.} \end{cases}$$

where f is the distance between the current frame and the most recent Intra frame, and $1 \le f \le I-1$.

When the Intra-frame period I is sufficiently large, the IR rate $\beta$ does not need to be adjusted. When I is sufficiently small, MB IR is not necessary. In other cases, the IR rate is linearly attenuated according to the distance of the current frame to the most recent Intra frame. This approach recognizes that when the current frame is further away from the next Intra-frame refresh, the frame should be more heavily protected with Intra MBs, in order to reduce the degradation resulting from potential error propagation.

Figure 14:
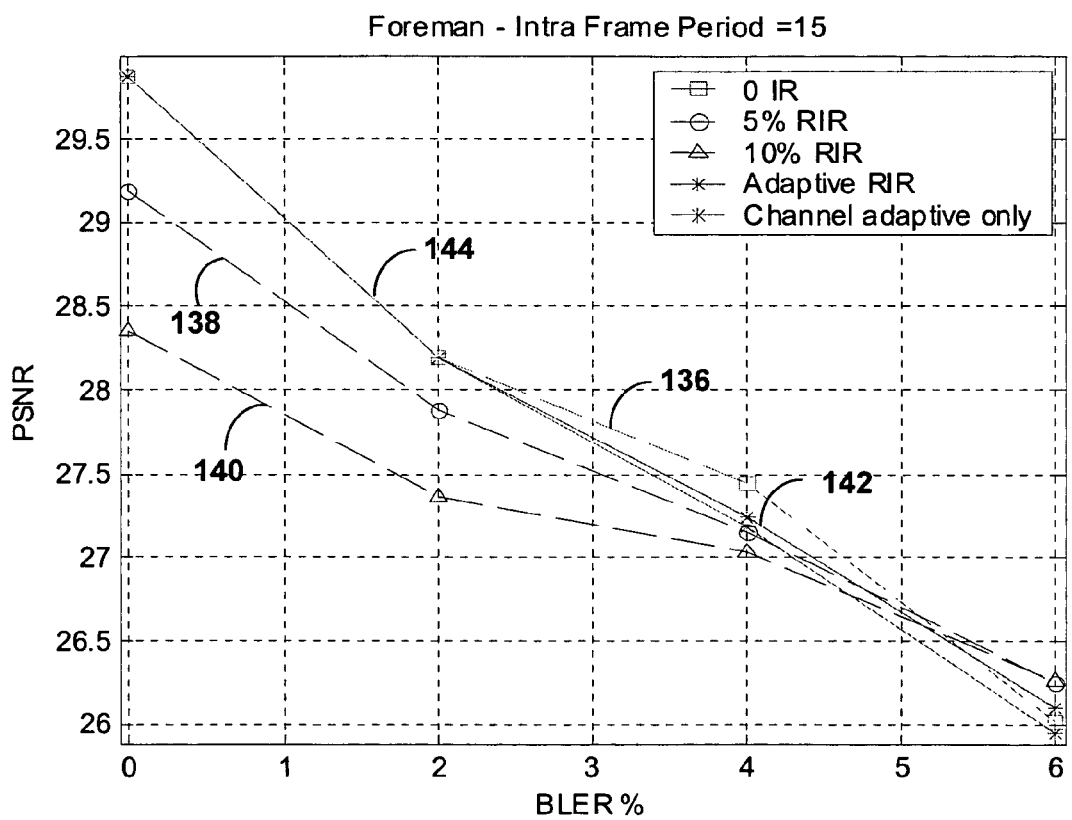
FIGS. 14 and 15 are graphs illustrating experimental results for various IR techniques using a technique as illustrated in FIG. 13.
Figure 15:
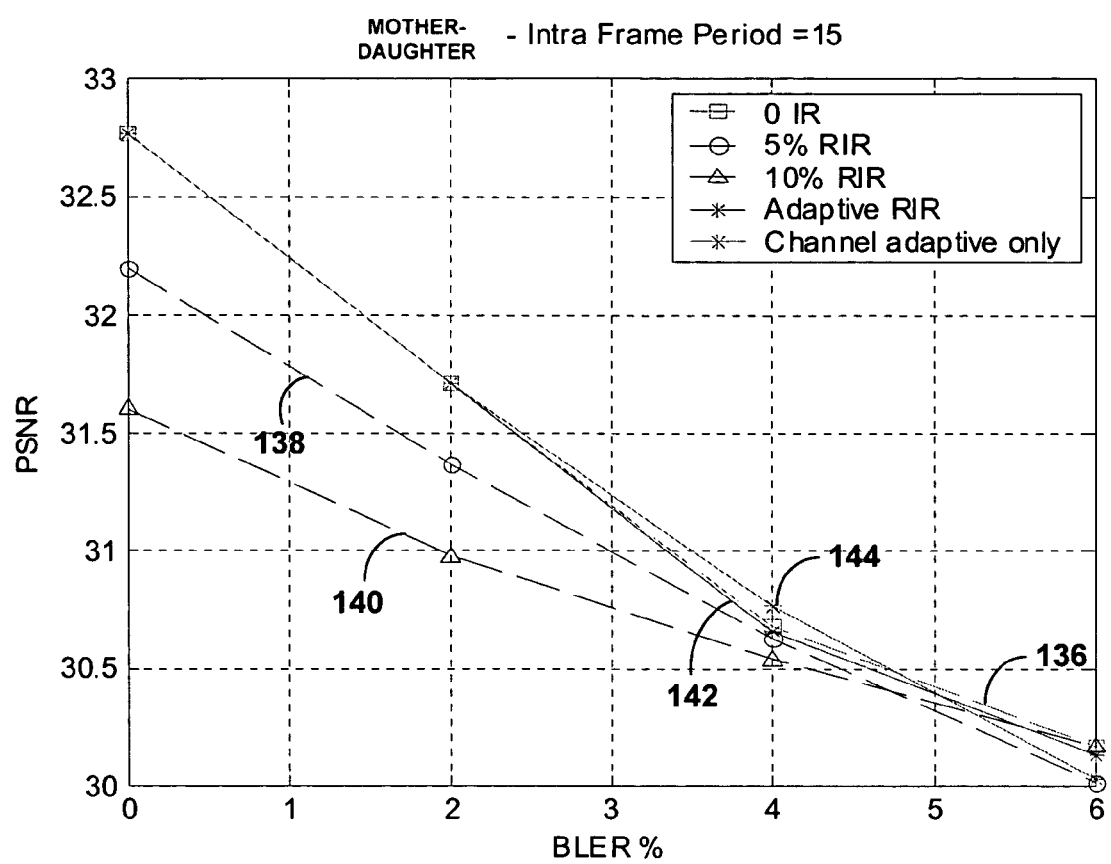

FIGS. 14 and 15 are graphs illustrating experimental results for various IR techniques using a technique as illustrated in FIG. 13. In FIGS. 14 and 15, curves 136, 138, 140, 142, and 144 represent results for represents results for (1) 0 percent IR, (2) 5% standard RIR, (3) 10% standard RIR, (4) adaptive RIR using estimated channel loss probability, SSD, and variance as described herein, and (5) adaptive RIR using only estimated channel loss probability, respectively.

In both FIGS. 14 and 15, a relatively short Intra-frame period of 15 is applied. However, FIG. 14 represents the Foreman sequence, while FIG. 15 represents the mother-daughter sequence. FIGS. 14 and 15 illustrate IR performance when the Intra-frame period is small (15 frames). At a loss rate of 2%, MB IR is not used. At loss rates of 4% and 6%, the IR rate is determined according to the Intra-refresh period adjustment formula for $\beta$, as described above with reference to FIG. 13. The results in FIGS. 14 and 15 demonstrate how the MB-level IR can back off gracefully in cases of small Intra-frame period and low loss rate.

Various embodiments have been described. These and other embodiments are within the scope of the following claims.

The invention claimed is:

1. A video encoding method comprising:
   obtaining, in a video encoder, a measure of frame-to-frame variation between a current video frame and another, previous video frame;
   obtaining, in the video encoder, texture information for the current video frame;
   obtaining an estimate of channel loss probability, wherein a variable p represents the obtained estimate of the channel loss probability; and
   generating, in the video encoder, an Intra-refresh (IR) rate for the current video frame based on the frame-to-frame variation, the texture information, and the channel loss probability estimate, wherein generating the IR rate comprises:
      multiplying $(p/(1-p))$ with a value that is based on the measure of frame-to-frame variation and the texture information, wherein the value that is based on the measure of frame-to-frame variation and the texture information is proportional to the measure of frame-to-frame variation and inversely proportional to the texture information, and
      generating the IR rate based on a product of the multiplication.

2. The method of claim 1, wherein obtaining a measure of the frame-to-frame variation includes obtaining a sum of square difference (SSD) value between the current frame and the another, previous frame, and the texture information characterizes texture complexity within the current frame.

3. The method of claim 1, wherein the texture information is based on pixel variation.

4. The method of claim 1, wherein obtaining the estimate of channel loss probability includes obtaining the estimate using control messages received from a remote terminal or based on loss of information transmitted by a remote terminal.

5. The method of claim 1, further comprising selecting Inter-coding or Intra-coding for all macroblocks (MBs) within the current frame based on the IR rate.

6. The method of claim 1, further comprising selecting Inter-coding or Intra-coding for individual macroblocks (MBs) within the current frame based on the IR rate.

7. The method of claim 1, further comprising updating the IR rate on a frame-by-frame basis.

8. The method of claim 1, further comprising updating the IR rate on a macroblock-by-macroblock basis within the current frame.

9. The method of claim 1, further comprising:
   selecting one of a plurality of grids within the current frame, wherein the current frame includes a plurality of macroblocks (MBs), and each of the grids contains a subset of the macroblocks (MBs); and
   applying the IR rate to select Intra-coding for macroblocks (MBs) within the selected grid.

10. The method of claim 9, further comprising selecting different grids in each of a plurality of successive frames, wherein each of the grids contains a substantially equal number of MBs.

11. The method of claim 9, further comprising selecting different grids in each of a plurality of successive frames, wherein the grids contain different numbers of MBs.

12. The method of claim 1, further comprising selecting Inter-coding or Intra-coding for macroblocks (MBs) within the current frame based on the IR rate and texture information associated with the MBs.

13. The method of claim 12, wherein the current frame includes a plurality of the macroblocks (MBs), and wherein the texture information is associated with the macroblocks, the method further comprising selecting Inter-coding or Intra-coding for the macroblocks (MBs) within the current frame based on a combination of selection of a cyclical pattern of MBs and a selection of MBs based on texture information associated with the MBs.

14. The method of claim 1, further comprising adjusting the IR rate based on an Intra-frame period, wherein adjusting the IR rate based on the Intra-frame period comprises determining whether to linearly attenuate the IR rate based on the Intra-frame period and the channel loss probability estimate, and, if determined to linearly attenuate, linearly attenuating the IR rate based on an inverse of a distance between the current frame and a most recent Intra frame.

15. The method of claim 1, wherein obtaining a measure of frame-to-frame variation comprises obtaining a measure of frame-to-frame variation between the current video frame and a reconstructed previous video frame.

16. The method of claim 1, further comprising applying the IR rate to encode the video frame.

17. A video encoder comprising:
   an Intra-refresh (IR) rate control unit to generate an IR rate for a current video frame based on a measure of frame-to-frame variation between the current video frame and another, previous video frame, a texture information for the current frame, and an estimated channel loss probability, wherein a variable p represents the estimated channel loss probability, wherein, to generate the IR rate, the IR rate control unit is configured to multiply $(p/(1-p))$ with a value that is based on the measure of frame-to-frame variation and the texture information, wherein the value that is based on the measure of frame-to-frame variation and the texture information is proportional to the measure of frame-to-frame variation and inversely proportional to the texture information, and generate the IR rate based on a product of the multiplication; and
   a mode select unit to select Inter-coding or Intra-coding for macroblocks (MBs) within the current video frame based on the IR rate.

18. The video encoder of claim 17, wherein the frame-to-frame variation is a sum of square difference (SSD) value between the current frame and the another, previous frame, and the texture information characterizes texture complexity within the current frame.

19. The video encoder of claim 18, wherein the another, previous video frame is a reconstructed previous video frame.

20. The video encoder of claim 17, wherein the texture information is based on pixel variation.

21. The video encoder of claim 17, wherein the estimate of channel loss probability is based on control messages received from a remote terminal, or loss of information transmitted by a remote terminal.

22. The video encoder of claim 17, wherein the mode select unit selects Inter-coding or Intra-coding for all macroblocks (MBs) in the current frame based on the IR rate.

23. The video encoder of claim 17, wherein the mode select unit selects Inter-coding or Intra-coding for individual macroblocks (MBs) within the current frame based on the IR rate.

24. The video encoder of claim 17, wherein the IR rate control unit updates the IR rate on a frame-by-frame basis.

25. The video encoder of claim 17, wherein the IR rate control unit updates the IR rate on a macroblock-by-macroblock basis within the current frame.

26. The video encoder of claim 17, wherein the mode select unit selects one of a plurality of grids within the current frame, wherein the current frame includes a plurality of macroblocks (MBs), and each of the grids contains a subset of the macroblocks (MBs), and the mode select unit applies the IR rate to select Intra-coding for macroblocks (MBs) within the selected grid.

27. The video encoder of claim 26, wherein the mode select unit selects different grids in each of a plurality of successive frames, and each of the grids contains a substantially equal number of MBs.

28. The video encoder of claim 26, wherein the mode select unit selects different grids in each of a plurality of successive frames, and the grids contain different numbers of MBs.

29. The video encoder of claim 17, wherein the current frame includes a plurality of macroblocks (MBs), and wherein the mode select unit selects Inter-coding or Intra-coding for the macroblocks (MBs) within the current frame based on the IR rate and texture information associated with the MBs.

30. The video encoder of claim 17, wherein the mode select unit selects Inter-coding or Intra-coding for the macroblocks (MBs) within the current frame based on a combination of selection of a cyclical pattern of the MBs and a selection of the MBs based on texture information associated with the MBs.

31. The video encoder of claim 17, wherein the IR rate control unit adjusts the IR rate based on an Intra-frame period, wherein, to adjust the IR rate based on the Intra-frame period, the IR rate control unit is configured to determine whether to linearly attenuate the IR rate based on based on the Intra-frame period and the channel loss probability estimate, and, if determined to linearly attenuate, linearly attenuate the IR rate based on an inverse of a distance between the current frame and a most recent Intra frame.

32. A non-transitory computer-readable data storage medium comprising processor executable instructions to cause a processor within a video encoder to:
obtain, in the video encoder, a measure of frame-to-frame variation between a current video frame and another, previous video frame;
obtain, in the video encoder, texture information for the current video frame;
obtain an estimate of channel loss probability, wherein a variable p represents the obtained estimate of the channel loss probability; and
generate, in the video encoder, an Intra-refresh (IR) rate for the current video frame based on the frame-to-frame variation, the texture information, and the channel loss probability estimate, wherein the instructions that cause the processor to generate the IR rate comprise instructions that cause the processor to:
multiply $(p/(1-p))$ with a value that is based on the measure of frame-to-frame variation and the texture information, wherein the value that is based on the measure of frame-to-frame variation and the texture information is proportional to the measure of frame-to-frame variation and inversely proportional to the texture information, and
generate the IR rate based on a product of the multiplication.

33. The non-transitory computer-readable storage medium of claim 32, further comprising instructions to cause the processor to obtain the frame-to-frame variation as a sum of square difference (SSD) value between the current frame and the another, previous frame, and the texture information characterizes texture complexity of the current frame.

34. The non-transitory computer-readable storage medium of claim 32, wherein the texture information is based on pixel variation.

35. The non-transitory computer-readable storage medium of claim 34, wherein the another, previous video frame is a reconstructed previous video frame.

36. A video encoding method comprising:
generating, in a video encoder, an Intra-refresh (IR) rate for a current video frame based on video content of the current video frame, a measure of frame-to-frame variation between the current video frame, and another, previous video frame, and a channel loss probability estimate, wherein a variable p represents the channel loss probability, and wherein generating the IR rate comprises:
multiplying $(p/(1-p))$ with a value that is based on the measure of frame-to-frame variation and the texture information, wherein the value that is based on the measure of frame-to-frame variation and the texture information is proportional to the measure of frame-to-frame variation and inversely proportional to the texture information, and
generating the IR rate based on a product of the multiplication;
determining, in the video encoder, whether to adjust the IR rate based on an Intra-frame period and the channel loss probability estimate;
if determined to adjust, adjusting, in the video encoder, the IR rate based on the Intra-frame period and the channel loss probability estimate; and
selecting, in the video encoder, Inter-coding or Intra-coding for macroblocks (MBs) within the current video frame based on one of the IR rate or the adjusted IR rate.

37. The method of claim 36, wherein the video content comprises a measure of variance of the current frame.

38. A video encoder comprising:
an Intra-refresh (IR) rate control unit to generate an IR rate for a current video frame based on video content of the current video frame, a measure of frame-to-frame variation between the current video frame, and another, previous video frame, and a channel loss probability estimate, wherein a variable p represents the channel loss probability, and wherein, to generate the IR rate, the IR rate control unit is configured to:
multiply $(p/(1-p))$ with a value that is based on the measure of frame-to-frame variation and the texture information, wherein the value that is based on the measure of frame-to-frame variation and the texture information is proportional to the measure of frame-to-frame variation and inversely proportional to the texture information, and generate the IR rate based on a product of the multiplication;

wherein the IR rate control unit is further configured to:

determine whether to adjust the IR rate based on an Intra-frame period and the channel loss probability estimate; and if determined to adjust, adjust the IR rate based on the Intra-frame period and the channel loss probability estimate; and a mode select unit to select Inter-coding or Intra-coding for macroblocks (MBs) within the current video frame based on one of the IR rate or the adjusted IR rate.

39. The video encoder of claim 38, wherein the video content comprises a measure of variance of the current frame.

40. A video encoder comprising:

means for obtaining a measure of frame-to-frame variation between a current video frame and another, previous video frame;

means for obtaining texture information for the current video frame;

means for obtaining an estimate of channel loss probability, wherein a variable p represents the obtained estimate of the channel loss probability; and means for generating an Intra-refresh (IR) rate for the current video frame based on the frame-to-frame variation, the texture information, and the channel loss probability estimate, wherein the means for generating the IR rate comprises:

means for multiplying $(p/(1-p))$ with a value that is based on the measure of frame-to-frame variation and the texture information, wherein the value that is based on the measure of frame-to-frame variation and the texture information is proportional to the measure of frame-to-frame variation and inversely proportional to the texture information, and means for generating the IR rate based on a product of the multiplication.

41. The video encoder of claim 40, wherein the means for obtaining a measure of the frame-to-frame variation includes means for obtaining a sum of square difference (SSD) value between the current frame and the another, previous frame, and the texture information characterizes texture complexity within the current frame based on variance of the current frame.

42. A video encoder comprising:

means for generating an Intra-refresh (IR) rate for a current video frame based on video content of the current video frame, a measure of frame-to-frame variation between the current video frame, and another, previous video frame, and a channel loss probability estimate, wherein a variable p represents the channel loss probability, and wherein the means for generating the IR rate comprises:

means for multiplying $(p/(1-p))$ with a value that is based on the measure of frame-to-frame variation and the texture information, wherein the value that is based on the measure of frame-to-frame variation and the texture information is proportional to the measure of frame-to-frame variation and inversely proportional to the texture information, and means for generating the IR rate based on a product of the multiplication;

means for determining whether to adjust the IR rate based on an Intra-frame period and the channel loss probability estimate;

means for adjusting the IR rate based on the Intra-frame period and the channel loss probability estimate if determined to adjust,; and means for selecting Inter-coding or Intra-coding for macroblocks (MBs) within the current video frame based on one of the IR rate or the adjusted IR rate.

* * * * *